S. COWAN.
Wheel-Cultivator.
No. 39,553.   Patented Aug. 18, 1863.
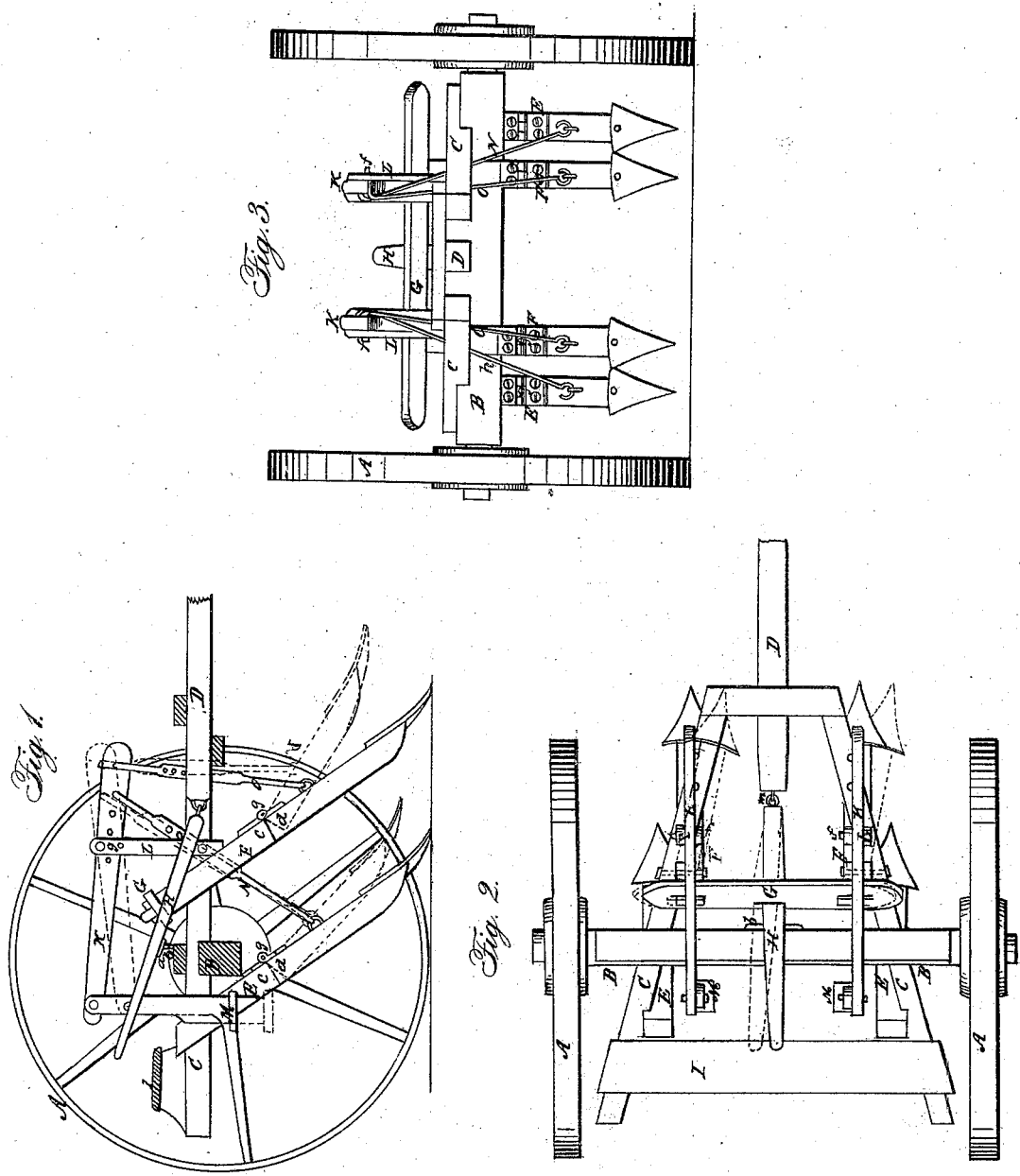
Witnesses:
Inventor:

UNITED STATES PATENT OFFICE.

SAMUEL COWAN, OF BLOOMFIELD, IOWA.

IMPROVEMENT IN CULTIVATORS.

Specification forming part of Letters Patent No. 39,553, dated August 18, 1863.

*To all whom it may concern:*

Be it known that I, SAMUEL COWAN, of Bloomfield, in the county of Davis and State of Iowa, have invented certain new and useful Improvements in Cultivators; and I do hereby declare that the following is a full, clear, and exact description of the construction and operation of the same, reference being had to the accompanying drawings, in which—

Figure 1 represents a longitudinal vertical section through said cultivator. Fig. 2 represents a top view. Fig. 3 represents a front view of the same.

My invention consists in making the stocks of the plows or cultivators in sections, and in hinging said sections together in such a manner that the machine may be used like an ordinary cultivator, while the hoes can be raised or lowered to pass plants or obstructions which may be in their line of motion.

It also relates to the combination of a lever and transverse bar with the plow-stock, by which the front hoes may be moved sidewise to throw them around a hill of corn, &c., or from side to side, as the case may be.

To enable others skilled in the art to make and use my invention, I will proceed to describe its construction and operation.

A represents the wheels of the cultivator.

B represents the axle.

C represents the frame, which is secured to the axle B, and to the front end of which the pole D is secured.

E and F represent the cultivator-stocks. The stocks E are rigidly secured near their upper ends to the frame C; but the stocks F are hinged to said frame in such a manner that they may be moved laterally, as represented in red lines in Fig. 2.

The upper ends of the plow-stocks F are connected to each other by the transverse G, to which the lever H is secured, and the front end of this lever is hung at $m$ to the rear end of the pole D. The lever H has a metal plate or catch, $a$, at its lower side, which rests in a corresponding notch of the plate $b$, to retain said lever in its proper position. The rear end of the lever extends to the driver's seat I, and by raising the lever and turning the same to one or the other side the driver may throw the front hoes to one or the other side of a corn-hill, as may be required. The stocks of the cultivators are made in two sections. The upper sections, $c$, are secured to the frame C, and the lower sections, $d$, are hinged by means of the hinge $g$ to the sections $c$.

K represents levers, which are pivoted at $f$ to the standards L, and each lever has a treadle, M, at its rear end, which is within convenient reach from the driver's seat, while the front end of the lever is connected with the lower sections of the cultivator-stocks by means of rods N and O, and thus the hoes of each pair of cultivators may be raised or lowered simultaneously and independently of the other pair, as represented in red lines in Fig. 1, for the purposes of passing hills, plants, or obstructions. The hinges $g$ being secured to the front sides of the stocks, said stocks are perfectly rigid when the hoes are forced through the ground for the purpose of cultivating.

Having thus fully described the nature of my invention, what I claim herein as new, and desire to secure by Letters Patent, is—

1. In combination with the adjustable and hinged cultivator-stocks, as herein described, the levers K, rods N O, and treadles M, substantially in the manner and for the purposes set forth.

2. In combination with the adjustable and hinged cultivator-stocks herein described, the lever H and transverse bar G, for the purpose of shifting said cultivators sidewise, substantially in the manner and for the purposes set forth.

SAMUEL COWAN.

Witnesses:
 JONATHAN HAYDEN,
 WILLIAM W. KITTLEMAN.